US009541401B1

(12) United States Patent
Brown et al.

(10) Patent No.: US 9,541,401 B1
(45) Date of Patent: Jan. 10, 2017

(54) METHOD AND SYSTEM FOR DETERMINING SHORTEST OCEANIC ROUTES

(71) Applicant: The United States of America, as represented by the Secretary of the Navy, Washington, DC (US)

(72) Inventors: Gerald G. Brown, Pebble Beach, CA (US); Alan R. Washburn, Monterey, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/853,330

(22) Filed: Sep. 14, 2015

Related U.S. Application Data

(63) Continuation-in-part of application No. 14/038,338, filed on Sep. 26, 2013, now abandoned.

(60) Provisional application No. 61/764,367, filed on Feb. 13, 2013.

(51) Int. Cl.
*G01C 21/34* (2006.01)
*G01C 21/00* (2006.01)

(52) U.S. Cl.
CPC .................................... *G01C 21/00* (2013.01)

(58) Field of Classification Search
None
See application file for complete search history.

(56) References Cited

U.S. PATENT DOCUMENTS

| | | | | |
|---|---|---|---|---|
| 4,862,373 A | * | 8/1989 | Meng | G01C 21/00 700/255 |
| 5,341,463 A | * | 8/1994 | Wescott | G09B 29/005 345/423 |
| 5,880,970 A | * | 3/1999 | Scepanovic | G06F 17/5077 716/126 |
| 6,226,560 B1 | * | 5/2001 | Hama | G06F 17/5077 700/117 |
| 6,415,427 B2 | * | 7/2002 | Nitta | G06F 17/5077 716/129 |
| 6,477,515 B1 | * | 11/2002 | Boroujerdi | G06Q 10/04 701/120 |

(Continued)

OTHER PUBLICATIONS

Weisstein, Eric W., "Spherical Polygon", From MathWorld—A Wolfram Web Resource, http//mathworld.wolfram.com/ShpericalPolygon.html, [retrieved from Internet Sep. 26, 2013], 1 page.

(Continued)

*Primary Examiner* — John R Olszewski
*Assistant Examiner* — Navid Ziaeianmehdizadeh
(74) *Attorney, Agent, or Firm* — Naval Postgraduate School; James B. Potts; Lisa A. Norris

(57) ABSTRACT

The present application provides systems and methods for quickly determining the shortest route from one arbitrary point in the ocean X to another Y. Specifically, the present application discloses a routing method that accepts two arbitrary points on the ocean and dynamically finds the shortest route between them that avoids a known set of "obstacles". According to an exemplary embodiment, each of these obstacles is a spherical polygon defined by its vertexes, with the adjacent pairs of vertexes connected to each other by bordering great-circle segments.

15 Claims, 2 Drawing Sheets

(56) References Cited

U.S. PATENT DOCUMENTS

| | | | | |
|---|---|---|---|---|
| 6,889,372 B1* | 5/2005 | Teig | G06F 17/5077 | 716/130 |
| 7,065,729 B1* | 6/2006 | Chapman | G06F 17/5077 | 716/129 |
| 2002/0104061 A1* | 8/2002 | Xing | G06F 17/5077 | 716/130 |
| 2002/0107711 A1* | 8/2002 | Xing | G06Q 30/0283 | 716/130 |
| 2005/0243736 A1* | 11/2005 | Faloutsos | G06Q 10/04 | 370/254 |
| 2006/0206623 A1* | 9/2006 | Gipps | G06Q 10/04 | 709/238 |
| 2006/0271898 A1* | 11/2006 | Kitamura | G06F 17/5077 | 716/129 |
| 2007/0061274 A1* | 3/2007 | Gipps | G06Q 10/04 | 705/400 |
| 2007/0238221 A1* | 10/2007 | Kitamura | G06F 17/5077 | 438/106 |
| 2007/0276709 A1* | 11/2007 | Trimby | A63F 13/00 | 705/6 |
| 2008/0255757 A1* | 10/2008 | Bruce | G01C 21/005 | 701/423 |
| 2009/0063035 A1* | 3/2009 | Mandel | G06Q 10/04 | 701/437 |
| 2010/0076640 A1* | 3/2010 | Maekawa | G05D 1/0217 | 701/26 |
| 2010/0289801 A1* | 11/2010 | Nachmanson | G06T 11/206 | 345/440 |
| 2012/0136634 A1* | 5/2012 | Yamade | G06Q 10/06 | 703/1 |
| 2012/0221237 A1* | 8/2012 | Jung | G05D 1/0274 | 701/400 |
| 2013/0046464 A1* | 2/2013 | Vis | G06Q 10/04 | 701/527 |

OTHER PUBLICATIONS

Fagerholt, K. et al., "Shortest Path in the Presence of Obstacles: An Application to Ocean Shipping", Journal of the Operational Research Society, vol. 51, No. 6, Jun. 2000, pp. 683-688.

Viegas, J., "Finding Shortest Paths in the Plane in the Presence of Barriers to Travel for Any lp-norm", European Journal of Operations Research, 20, 1985, pp. 373-381.

Vincenty, T., "Direct and Inverse Solutions of Geodesics on the Ellipsoid With Application of Nested Equations", Survey Review, vol. XXIII, No. 176, Apr. 1975, pp. 88-93.

Weisstein, Eric W., "Spherical Trigonometry", From MathWorld—A Wolfram Web Resource, http//mathworld.wolfram.com/ShpericalTrigonometry.html, [retrieved from Internet Sep. 20, 2013], 3 pages.

* cited by examiner

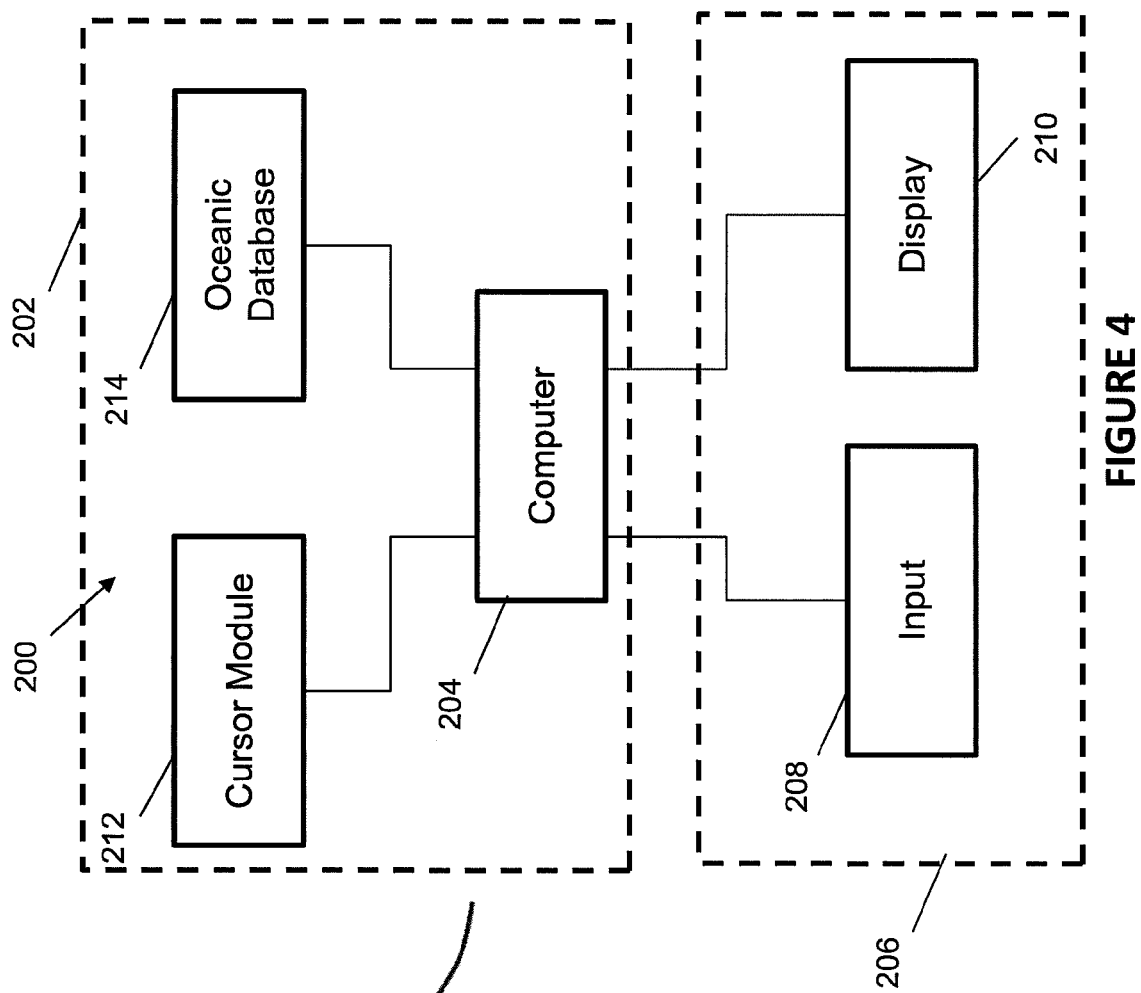
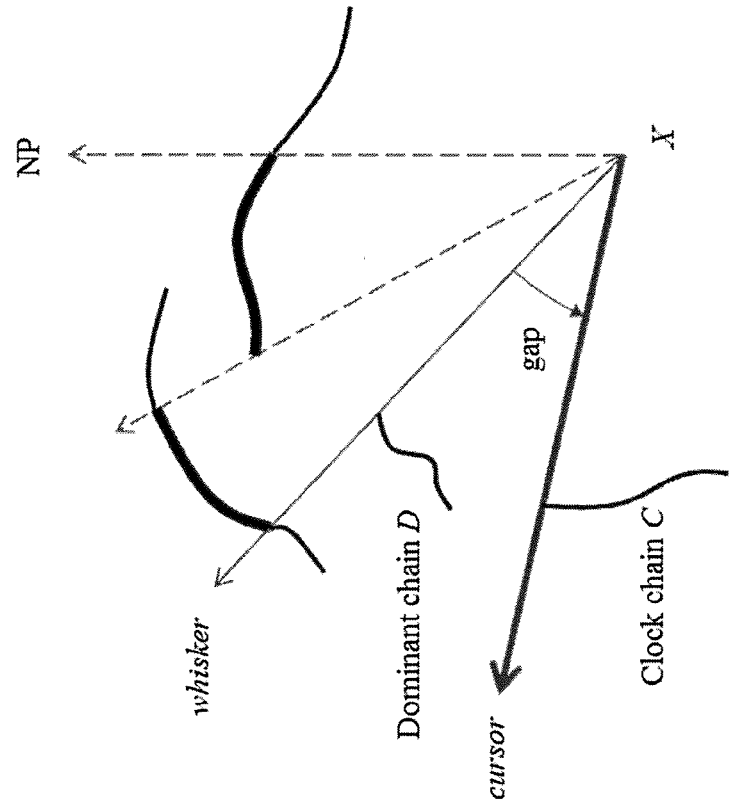
FIGURE 3
FIGURE 4

US 9,541,401 B1

METHOD AND SYSTEM FOR DETERMINING SHORTEST OCEANIC ROUTES

REFERENCE TO RELATED APPLICATIONS

This application claims priority to and the benefit of U.S. Provisional Patent Application Ser. No. 61/764,367, filed Feb. 13, 2013, and entitled "METHOD FOR DETERMINING SHORTEST OCEANIC ROUTES", and is a Continuation-in-Part of U.S. Utility patent application Ser. No. 14/038,338, filed Sep. 26, 2013 and entitled "METHOD FOR DETERMINING SHORTEST OCEANIC ROUTES", the entirety of which are hereby incorporated by reference.

BACKGROUND

The present exemplary embodiment relates to determining shortest oceanic routes. It finds particular application in conjunction with routing a ship from one arbitrary point in the ocean X to another Y, and will be described with particular reference thereto. However, it is to be appreciated that the present exemplary embodiment is also amenable to other like applications.

A problem exists with the routing of a ship from one arbitrary point in the ocean X to another Y. The goal of routing a ship between arbitrary points is to quickly find the shortest route that does not run aground. In oceanic routing, the ocean is treated as a continuum. As such, it is not possible to make a list of all the possible values for various points X and Y in the ocean, together with a shortest route for each pair. Instead, the shortest route must be computed quickly once X and Y are discovered.

Our abstract Earth is a perfect sphere, has unit radius, and is cluttered with "obstacles" including land masses, coral reefs, shallow water depths, and the like. Each obstacle is represented by a polygon described by vertex points in clockwise order. All obstacles on Earth can be seen in their entirety by an observer located outside the Earth, and the word "clockwise" should be understood to be from the viewpoint of such an observer. These polygons (the interiors, to be precise) must be avoided in the process of getting from point X to point Y, hence the term obstacle. Points, like X and Y, that are the subject of shortest route calculations will be referred to as "location points", such as "initial location point X" and "destination location point Y".

Each pair of adjacent vertexes (i,j) on the border of an obstacle is connected by a segment of a great circle; this segment is the shortest distance between the two vertexes. Such great circle segments always have a length that is less than $\pi$, and will be referred to simply as "segments" in the following. The vertexes of the polygons are all assumed to be distinct, and it is also assumed that the polygons do not intersect or touch one another. It takes roughly 1000 vertexes to describe all of the obstacles on the Earth with sufficient detail for routing decisions.

For vertex i, the notations i.next and i.previous are utilized for the next and previous vertex as the obstacle is traversed in clockwise order. Thus, point Y is "visible" from point X (or vice versa—the relationship is symmetric) if there is some segment (X,Y) connecting X to Y that does not include an interior point from any obstacle. That segment will be unique unless X and Y are antipodes.

The motivation for the present application relates to the resupply of US Naval ships at sea (a kind of Traveling Salesman problem). In those scenarios, thousands of shortest-route calculations must be done in a time insensible to a human, so speed in finding the shortest route is of the essence.

The present application provides a method and system that quickly determines the shortest oceanic route between X and Y, using an oceanic routing system including a computing device configured to execute instructions to calculate the shortest oceanic route from an initial location point X to a destination location point Y.

BRIEF DESCRIPTION

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

In accordance with one aspect of the present exemplary embodiment, disclosed is a method of determining a shortest oceanic route from an initial location point X within an ocean to a destination location point Y within the ocean using an oceanic routing system including a memory and a processor communicatively coupled to the memory for performing the method, the method comprising a) defining a plurality of obstacles within the ocean, each obstacle defined as a plurality of adjacent vertexes associated with a continuous boundary of the obstacle defining an interior region of the obstacle and an exterior region of the obstacle, b) receiving the initial location point X and the destination location point Y; c) determining if the destination location point Y is visible from the initial location point X, where visibility is defined as a great circle arc segment XY connecting the initial location point X and the destination location point Y without intersecting one or more interior regions associated with the plurality of obstacles; d) if the destination location point Y is determined to be visible from the initial location point X, defining the great circle arc segment as the shortest oceanic route from the initial location point X to the destination location point Y; e) if the destination point Y is determined not to be visible from the initial location point X, calculating the shortest oceanic route by determining a first set of one or more vertexes i visible from the initial location point X, determining a second set of one or more vertexes j visible from the destination location point Y, and determining the shortest oceanic route associated with the minimal distance from the initial location point X to the final location point Y by only calculating distances from the initial location point X through the first set of one or more vertexes i visible from the initial location point X, only calculating distances from the second set of one or more vertexes j visible from the destination location point Y to the destination location point Y, and accessing predetermined data to determine one or more minimal distances and associated route segments from the first set of one or more vertexes i visible from the initial location point X to the second set of one or more vertexes j visible from the destination location point Y, where a vertex i is considered to be visible from X if a great circle arc segment Xi connects the initial location point X and the vertex i without intersecting one or more interior regions associated with the plurality of obstacles, and a vertex j is considered to be visible from Y if a great circle arc segment Yj connects the destination location point Y and the vertex j without intersecting one or more interior regions associated with the plurality of obstacles; and f) displaying the shortest oceanic route on an electronic display.

In accordance with another aspect of the present exemplary embodiment, disclosed is a non-transitory computer readable medium with computer executable instructions for determining a shortest oceanic route from an initial location point X within an ocean to a destination location point Y within the ocean using an oceanic routing system including a memory and a processor communicatively coupled to the memory for performing the executable instructions, the method comprising a) defining a plurality of obstacles within the ocean, each obstacle defined as a plurality of adjacent vertexes associated with a continuous boundary of the obstacle defining an interior region of the obstacle and an exterior region of the obstacle, b) receiving the initial location point X and the destination location point Y; c) determining if the destination location point Y is visible from the initial location point X, where visibility is defined as a great circle arc segment XY connecting the initial location point X and the destination location point Y without intersecting one or more interior regions associated with the plurality of obstacles; d) if the destination location point Y is determined to be visible from the initial location point X, defining the great circle arc segment as the shortest oceanic route from the initial location point X to the destination location point Y; e) if the destination point Y is determined not to be visible from the initial location point X, calculating the shortest oceanic route by determining a first set of one or more vertexes i visible from the initial location point X, determining a second set of one or more vertexes j visible from the destination location point Y, and determining the shortest oceanic route associated with the minimal distance from the initial location point X to the final location point Y by only calculating distances from the initial location point X through the first set of one or more vertexes i visible from the initial location point X, only calculating distances from the second set of one or more vertexes j visible from the destination location point Y to the destination location point Y, and accessing predetermined data to determine one or more minimal distances and associated route segments from the first set of one or more vertexes i visible from the initial location point X to the second set of one or more vertexes j visible from the destination location point Y, where a vertex i is considered to be visible from X if a great circle arc segment Xi connects the initial location point X and the vertex i without intersecting one or more interior regions associated with the plurality of obstacles, and a vertex j is considered to be visible from Y if a great circle arc segment Yj connects the destination location point Y and the vertex j without intersecting one or more interior regions associated with the plurality of obstacles; and f) displaying the shortest oceanic route on an electronic display.

In accordance with another aspect of the present exemplary embodiment, disclosed is an oceanic routing system comprising an electronic display; and at least one processor and at least one memory operatively coupled with each processor, at least one processor and at least one memory configured to execute instructions to perform a method of determining a shortest oceanic route from an initial location point X within the ocean to a destination location point Y within the ocean, the method comprising a) defining a plurality of obstacles within the ocean, each obstacle defined as a plurality of adjacent vertexes associated with a continuous boundary of the obstacle defining an interior region of the obstacle and an exterior region of the obstacle, b) receiving the initial location point X and the destination location point Y; c) determining if the destination location point Y is visible from the initial location point X, where visibility is defined as a great circle arc segment XY connecting the initial location point X and the destination location point Y without intersecting one or more interior regions associated with the plurality of obstacles; d) if the destination location point Y is determined to be visible from the initial location point X, defining the great circle arc segment as the shortest oceanic route from the initial location point X to the destination location point Y; e) if the destination point Y is determined not to be visible from the initial location point X, calculating the shortest oceanic route by determining a first set of one or more vertexes i visible from the initial location point X, determining a second set of one or more vertexes j visible from the destination location point Y, and determining the shortest oceanic route associated with the minimal distance from the initial location point X to the final location point Y by only calculating distances from the initial location point X through the first set of one or more vertexes i visible from the initial location point X, only calculating distances from the second set of one or more vertexes j visible from the destination location point Y to the destination location point Y, and accessing predetermined data to determine one or more minimal distances and associated route segments from the first set of one or more vertexes i visible from the initial location point X to the second set of one or more vertexes j visible from the destination location point Y, where a vertex i is considered to be visible from X if a great circle arc segment Xi connects the initial location point X and the vertex i without intersecting one or more interior regions associated with the plurality of obstacles, and a vertex j is considered to be visible from Y if a great circle arc segment Yj connects the destination location point Y and the vertex j without intersecting one or more interior regions associated with the plurality of obstacles; and f) displaying the shortest oceanic route on an electronic display.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 3 is an exemplary application of the Cursor Algorithm in accordance with the present application; and FIG. 4 is an illustration of a system for determining shortest oceanic routes.

DETAILED DESCRIPTION

Figure 1:
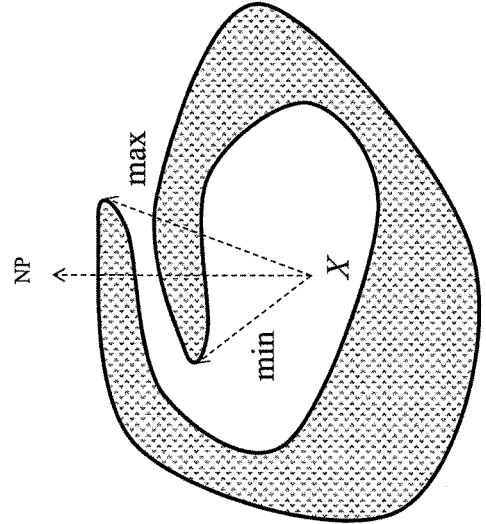
FIG. 1 is an illustration of an obstacle in accordance with the present application.

The present application is directed to determining the shortest route from one arbitrary location point in the ocean X to another Y. Ships can be anywhere on the ocean, so one cannot appeal to a database of preexisting optimal routes. Instead, the present application discloses a routing method that dynamically finds the shortest route between X and Y that avoids a known set of obstacles. Each of these obstacles is a spherical polygon defined by its vertexes, with adjacent vertexes connected by great-circle segments in a clockwise manner. The shortest route from one arbitrary point to another will consist of a sequence of great circle segments. The simplest case is where the route goes directly from X to Y, a point-to-point route. If this is impossible, the route will begin and end with point-to-vertex segments, possibly with additional intermediate vertex-to-vertex segments. It is critical that each of these segments does not cross any obstacle boundary; that is, that the end points are "visible" to each other. The core of our routing method is the Cursor Algorithm for determining visibility. Once visibility is determined, the shortest visible route is determined and displayed.

As mentioned above, to determine visibility between points, the Cursor Algorithm is utilized. The Cursor Algorithm determines visibility to all other points, including vertexes, from an arbitrary point X that may or may not be a vertex. Specifically, for each obstacle, the Cursor Algorithm measures the angle from X to each of the vertexes defining the obstacles. As one proceeds clockwise around an obstacle, the angle will exhibit occasional maxima and minima. All vertex sequences between a maximum and the next minimum are "chains" that are added to a global database of chains. The starting angle of each chain is its maximum angle, and the minimum angle is its ending angle. It would be equivalent to proceed counterclockwise around the obstacle and reverse the roles of maxima and minima. The chains are sorted based on their starting angles, and the Cursor Algorithm proceeds through them in order. The Cursor Algorithm involves a "cursor" that can be imagined as a ray connecting X to one of the starting angles, moving from one chain to the next. As the cursor proceeds through the chains, it is followed by a "whisker" that deals with various phenomena that happen between chain starts, mapping out a "border" as it goes. The details of this procedure are explained below. The border about point X can be imagined to be a part of the ocean that is limited by the first contact with an obstacle in every direction. Once the border is determined, visibility from X to any other point Y can be easily determined by comparing the distance from X to Y with the distance from X to the border, with Y being visible if and only if the former is no larger than the latter. Such comparisons are easily accomplished utilizing conventional means and methods.

Although the locations of ships are infinitely variable, the vertexes defining the obstacles remain constant. The vertex-to-vertex shortest routes can therefore be pre-computed and stored, awaiting use in finding shortest routes between arbitrary ship locations. The Cursor Algorithm can also be used to determine vertex-to-vertex visibility, but its speed is not important in these "static" computations. It is in the "dynamic" computations involving arbitrary points X and Y where the speed of the Cursor Algorithm is most valuable.

As used herein, "points," such as X and Y, refer to destinations that are located by their latitude and longitude, symbolically X.lat and X.lon. To avoid repeated evaluations of sines and cosines, properties of a point X also include X.slat, X.clat, X.slon, and X.clon, those four numbers being $\sin(X.lat)$, $\cos(X.lat)$, $\sin(X.lon)$, and $\cos(X.lon)$, respectively. Further, as used herein, "vertexes" are the points mentioned above that describe obstacles. For vertex i, the notation i.next and i.previous will be used for the next and previous vertex as the obstacle is described in clockwise order. Additionally, as used herein, the destination Y is "visible" from destination X (or vice versa) if the segment (X,Y) connecting X to Y does not include an interior point from any obstacle. Further, as used herein, an "obstacle" is a structure or area with which a ship cannot pass through such as land masses, coral reefs, shallow water depths, politically restricted areas and the like.

In determining the shortest route from one arbitrary point in the ocean X to another Y, determining visibility is critical. If Y is visible from X, then the shortest route is simply the great circle segment that connects them. If Y is not visible from X, then the shortest route will go from X to some vertex i visible from X, then from vertex to vertex until some vertex j is encountered from which Y is visible, and finally from j to Y Vertexes i and j may be the same vertex. Let $S_X$ and $S_Y$ be the set of vertexes visible from X and Y, respectively, hereafter the "visibility sets." Neither of these sets can be empty unless Y is visible from X. Let $d(X,Y)$ be the length of the (X,Y) segment when obstacles are ignored, and let $D(X,Y)$ be the shortest distance between X and Y when obstacles are considered. These two functions are defined for all pairs of points on Earth, including vertexes, as long as both points are "wet"; that is, as long as neither point is in the interior of an obstacle. The first function is simply the length of the great circle segment between X and Y, an easy calculation. Computing the second function is the object of the Cursor Algorithm. The connection between the two is:

$$D(X, Y) = \begin{cases} d(X, Y) \text{ if } Y \text{ is visible from } X, \text{ or otherwise} \\ \min_{i \in S_X, j \in S_Y} d(X, i) + D(i, j) + d(j, Y) \end{cases}$$

The tasks necessary for the determination of D(X,Y) are partitioned into two tasks, a static task and a dynamic task. Static tasks are those that do not require knowledge of X or Y, while dynamic tasks cannot be carried out until X and Y are specified. The principal static task is the determination of the matrix of inter-vertex distances D(i,j) for all vertex points, together with the sequence of vertexes i, . . . , j that constitutes the shortest route from i to j. The dynamic task is to determine whether wet point Y is visible from wet point X, and, if not, to determine the visibility sets and carry out the minimization in formula (1.1) above. It is important that the dynamic task of determining the visibility sets be accomplished quickly.

Although the Cursor Algorithm is as applicable to finding the shortest distances between vertexes as it is to general wet points, there is no need for determining the inter-vertex distances quickly. The approximately 1000×1000 matrix of inter-vertex distances can be computed, stored, updated, and recalled when needed. Winds, currents, politics, and the like can be considered in computing this matrix, so it is not necessarily symmetric.

Determining visibility is in most cases trivial for a human looking at a globe, but is nonetheless a significant computational task. The Cursor Algorithm permits the rapid determination of the visibility sets $S_X$ and $S_Y$ that are utilized in the above algorithm (1.1). Only visibility from X will be described below. Visibility from Y is treated similarly. Specifically, the Cursor Algorithm determines visibility from X to all vertexes, as well as a "Border" function B(ø, X) about X, for $0 \le ø \le 2\pi$. The meaning of B(ø, X) is "the largest distance at which a point with bearing angle ø is visible." Thus, visibility to any other destination Y is easily determined by calculating the distance R and bearing ø of Y from X. If and only if $R \le B(ø, X)$, then Y is visible.

If X is a vertex i, then the visibility set for X is simply {i}. This is true even if other vertexes are visible from X because d(X,i)=0, the shortest possible distance between two points. The visibility set $S_X$ is thus actually a subset of the vertexes that are visible from X. This will be seen to be true even when X is not a vertex. The smaller the visibility sets, the faster formula (1.1) can be accomplished.

Given an arbitrary wet point X that is not a vertex, imagine moving along a great circle at initial course ø (along a ray, that is) until some obstacle is encountered. The distance at which that happens is by definition the border function B(ø, X). Given this border function for all ø, visibility to any other point Y, whether vertex or not, is easily determined by calculating the distance R and bearing ø of Y from X. If R≤B(ø, X), then Y is visible. The method of computing the crucial border function involves the concept of a "chain" of vertexes which will be described further below.

The Cursor Algorithm determines whether X is in the interior of each obstacle, and, if not, then which of the obstacle vertexes are visible. To accomplish this, first arbitrarily select a non-pole starting vertex $i_0$ in the obstacle and let its angle $A(i_0)$ be the clockwise angle from (X,NP) to (X,$i_0$), where NP stands for the North Pole. This is the initial course that X would take in moving to $i_0$ along a shortest path. Then set i to $i_0$ and go through the vertexes of the obstacle in clockwise order. Let e be the clockwise angle from (X,i) to (X,i.next), a number in the interval (−π, π), and let A(i.next)=A(i)+θ.

Applied iteratively, this relation defines the angles for all vertexes in the obstacle, including finally $i_0$. The meaning of A(i) is in all cases "the initial course from X to i," except that these "winding" angles are not confined to any specific interval by modular arithmetic. This lack of confinement means that winding angles can differ from each other by more than 2π, as in FIG. 1, where the winding angle to the vertex labeled "max" exceeds the winding angle to the vertex labeled "min" by more than 2π (all angles are measured in radians, so 2π is a full circle.) In FIG. 1 only the max and min vertexes are marked—imagine the rest distributed continuously along the boundary. The terminal calculation of $A(i_0)$ may therefore not agree with the initial definition. There are three possibilities for the terminal angle $A(i_0)$:

1) $A(i_0)$ may have increased by 2π from its initial value. If so, X is in the interior of the obstacle, or 2) $A(i_0)$ may be unchanged from its original value, or 3) $A(i_0)$ may have decreased by 2π. If so, the antipode of X is in the interior of the obstacle.

The Cursor Algorithm terminates in possibility 1) because X is not wet. Assume for the moment that possibility 2) holds. It will later be shown that essentially the same logic also applies to possibility 3).

There may some vertexes i where A(i.previous)<A(i)≥A (i.next). Such vertexes are by definition "maxima." Similarly, "minima" are vertexes where A(i.previous)≥A(i)<A (i.next). As one proceeds clockwise around the obstacle, a maximum can only be followed by a minimum (possibly with several intermediate vertexes that are not extremes), and vice versa. The sequence of vertexes from a maximum to a minimum is a "chain" that includes its start at the maximum and its end at the minimum. Relative to X, a chain proceeds angularly counterclockwise as one proceeds clockwise though the vertexes; that is, the angles along a chain always decrease monotonically. For chain c, the notation c.start will be used for the starting vertex and c.end for the ending vertex. Because a vertex cannot be both a maximum and a minimum, c.start and c.end cannot be the same vertex. Chains can never intersect with one another because obstacles never intersect with themselves or one another. Maxima, minima, and chains exist in the same number, so the obstacle shown in FIG. 1 has only a single chain that extends from max to min along the inner boundary of the obstacle. All vertexes that are not on chains are invisible to X, so the visible vertexes are a subset of those belonging to chains. This is an important observation because all vertexes not on chains are automatically invisible, and can therefore be excluded from the visibility sets. These are the vertexes on the "outside" of the obstacle in FIG. 1.

Proceeding from X to NP in FIG. 1 would encounter the obstacle's only chain twice. The second intersection would be at an invisible point, so for a vertex to be visible it is necessary, but not sufficient that it be on a chain. The set of obstacles thus spawns a set of chains. The number of chains depends on X, but is usually a few hundred when all obstacles are considered. The collection of obstacles has now been reduced to a collection of angularly monotonic, non-intersecting chains. The obstacles themselves play no further role in the Cursor Algorithm.

In the continuous case, the vertexes are infinitely dense on the chains, so that every line that intersects a chain will do so at a vertex. This feature makes the continuous case conceptually simpler than the discrete case, so it will described first.

If the distance to c.start is less than the distance to c.end, then chain c is "spiraling out", or otherwise "spiraling in". For a given chain c, it is possible that A(c.start)−A(c.end) >2π as shown in FIG. 1. If that is the case for a chain that is spiraling out, then the part of the chain from A(c.end) to A(c.start)−2π is irrelevant because it is hidden from X by the part from A(c.start) to A(c.start)−2π. Therefore, the hidden part of c can be deleted, effectively setting A(c.end) to A(c.start)−2π which results in "cutting off the tail". If a long chain is instead spiraling in, as is the only chain in FIG. 1, this results in "cutting off the head" by setting A(c.start) to A(c.end)+2π. In this manner, all chains can be reduced to chains whose angular length is in the interval (0, 2π), and any ray from X will intersect a given chain at most once. If its angular length is 2π, a chain is called "full circle." It is not possible for a chain to have a zero length.

Chain c will be said to cover angle if A(c.end)<+2kπ≤A (c.start) for some integer k. The addition of k circles to is necessary because there are no absolute limits to the angles of the vertexes in a chain. A chain covers an angular interval if it covers every angle within that interval.

If c covers ø, let L(c, ø) be the length of the segment from X to the intersection point of c with the ray from X at angle ø. Because of the spiraling adjustments, the intersection point is unique and therefore L(c, ø) is well defined.

Among all of the chains that cover ø, the "dominant" chain c is the one for which L(c, ø) is a minimum, and the minimum value is the border function B(ø,X). It is not possible to have ties for dominance because chains never intersect, but it is possible that no chain will cover ø, in which case the dominant chain at ø is the "White" chain that does not limit visibility. The successor of chain c is the dominant chain at angle A(c.end). Because chain c does not cover A(c.end), the successor of c cannot be c.

Only chains that are neither White nor full circle have a successor, so chain c is assumed to be neither White nor full circle in the rest of this paragraph. Imagine sitting at X shining a laser at the end of chain c. If you move the laser slightly counterclockwise, the beam will no longer illuminate c. The chain that it does illuminate is its successor. Mathematically, the successor of c is the eligible chain x that has the smallest score L(x, ø) at angle =A(c.end). All full-circle chains are eligible, and otherwise chain x is eligible if it covers ø without using its endpoint; that is, if $(A(x.end)-\emptyset) \mod 2\pi \neq 0$. Thus, c cannot be its own successor. If no non-White chain is eligible, then the successor is White.

The object of the Cursor Algorithm is to find the dominant chain at every angle in the interval $(0,2\pi)$. Angles for which c is dominant are described as "marked" with c. The basic idea is that if c is dominant at angle , it will also be dominant over some angular interval containing , and it will therefore suffice to compute and remember the limits of intervals that are uniformly marked with a single dominant chain.

If there are no chains except for White, then all angles are marked White and the algorithm terminates. Otherwise, the Cursor Algorithm begins by selecting an arbitrary non-White "clock" chain $C_0$ and subtracting $A(C_0.start)$ from all angles in all chains, thus rotating the angular frame of reference so that the starting angle of C is 0. For each chain, the starting angle is then adjusted to be in the interval $(0,2\pi)$ by adding some integer multiple of $2\pi$, and the same adjustment is made to all other angles in the chain, thereby preserving angular differences within each chain. The exception is that angles in $C_0$ are adjusted so that the starting angle is 0 (so $C_0$ has no positive angles). The term "clock" is used because, although the definition of C will change as the algorithm proceeds, the starting angle of C (the "cursor", see below) will progress monotonically through a full circle.

The notation C.next will be used for the chain following C in counterclockwise order of their starting angles (if multiple chains happen to have the same starting angle, the ordering among them can be arbitrary). The initial dominant chain c at angle $2\pi$ is determined. This initial dominant chain c cannot be White because C itself covers $2\pi$, but c could be C. Specifically, the clock chain is initialized at $C_0$, and is iteratively succeeded by C.next until $C_0$ is encountered again, so every chain will take its turn as the clock chain. The cursor will always be the angle of the starting vertex of the clock chain.

The Cursor Algorithm also involves an angle "whisker" that starts at $2\pi$ and is always clockwise from (at least as large as) the cursor. Basically, the cursor jumps counterclockwise from one clock chain starting angle to the next, and the whisker catches up to the cursor after each jump by moving counterclockwise to the cursor, marking angles with the dominant chain as it moves. The chain that is dominant at the whisker will be called D, with the initial value $D_0$ being the chain that is dominant at $2\pi$. Chain $D_0$ could be $C_0$, since $C_0$ covers $2\pi$, but in any case $D_0$ is not White. The angular interval from the whisker counterclockwise to the cursor, including both endpoints, is the "gap", so the gap is repeatedly reduced to a single point when the whisker catches up to the cursor.

Figure 2:
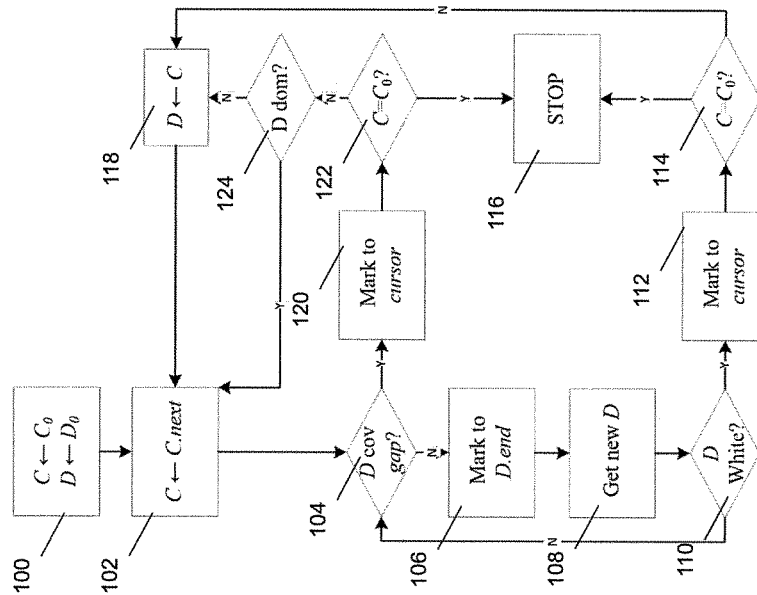
FIG. 2 is a flowchart diagram for the Cursor Algorithm in accordance with the present application.

With Reference to FIG. 2, a flowchart diagram for the Cursor Algorithm is illustrated. The Cursor Algorithm starts by setting the whisker to $2n$. The setting of the cursor is irrelevant, since it will change in the next step. After the whisker is set, the cursor is set to the start of the next clock chain in counterclockwise order. The → symbol means that the left-hand side is updated by the right-hand side. All tests are binary, with "Y" or "N" marking the exit where the answer is true or false. All three "Mark" boxes move the whisker counterclockwise to the stated limit, marking all angles with D and reducing the gap. "Mark to cursor" reduces the gap to a single point, where it will remain until the algorithm stops or the clock chain is again updated. The test labeled "D coy gap?" determines whether chain D covers the gap. "Get new D" replaces chain D with its successor. The test labeled "D dom?" determines whether chain D dominates chain C at the whisker (or at the cursor, since both are equal at this point).

Specifically, in step 100, chain C and chain D are updated by the values of $C_0$ and $D_0$ respectively. In step 102, the Cursor Algorithm sets chain C to C.next. In step 104, the Cursor Algorithm determines whether chain D covers the gap. If chain D does not cover the gap, chain D is marked to D.end in step 106 and chain D is replaced with its successor chain in step 108. In step 110, it is determined if successor chain D is White. If successor chain D is not White, the Cursor Algorithm determines whether successor chain D covers the gap in step 104. If successor chain D is determined to be White, then chain C is marked in step 112. In step 114, it is determined if marked chain C is the initial chain $C_0$. If so, the Cursor Algorithm is stopped in step 116. If not, then chain D is updated by marked chain C in a step 118. After step 118, the Cursor Algorithm sets marked chain C to C.next step 102. If chain D covers the gap, chain C is marked in step 120 and is tested for being the initial chain $C_0$ in step 122. If so the Cursor Algorithm is stopped in step 116. If not it is determined whether chain D dominates chain C at the whisker in step 124. If chain D does not dominate chain C, then chain D is updated by the marked chain C in step 118. If chain D dominates chain C, the Cursor Algorithm sets marked chain C to C.next in step 102.

FIG. 3 illustrates a situation where chain C has been found dominant at the whisker, and is about to be marked dominant to its end, thus partially filling the gap. Next, the White chain will be found dominant up to cursor, after which the gap will be closed and the cursor will move again. Previously marked parts of chains are shown heavy, and past whisker positions are shown as dashed rays from X, the starting ray being towards NP. In other words, FIG. 3 illustrates a situation where the whisker has not yet caught up to the cursor, with the gap being the angular interval between them. When the whisker catches up, the cursor moves again. Specifically, FIG. 3 illustrates the step in the flowchart of FIG. 2 where the cursor has advanced after D has been reset in the box labeled "D→C". The whisker will move counterclockwise to the cursor to close the gap. The next marking will be in the "Mark to D.end" box, after which the dominant chain will be White.

With further reference to FIG. 3, the Cursor Algorithm partitions the interval $(0, 2\pi)$ into subintervals within each of which a single chain is dominant. If there were no chains other than the four pictured in FIG. 3, there would be six such intervals at completion, one for each pictured chain and two for the White chain. The first interval determined by the Cursor Algorithm would be the one from the pictured whisker to the dashed ray just clockwise of it ($D_0$ is known to be dominant over the pictured heavy segment, but its entire interval of dominance has not yet been established). The second interval would encompass all of D, and the third would be a White interval with the cursor at one end. In general, the partition can be stored as a sequence of $(c_k,\psi_k)$ pairs where $\psi_k$ is the upper end of the interval where $c_k$ is dominant, the lower end being the upper end of the previous interval. This sequence of pairs $(c_k,\psi_k)$ is referred to as the "border" of X. A border typically consists of about 10 intervals. Once the border is stored, the dominant chain at angle can be easily determined by first determining the index k of the interval that include ø. $B(\emptyset,X)$ is then the distance to the unique intersection of a ray from X at angle ø with $c_k$. That distance defines visibility from X at angle ø.

Computation of the border of X can be regarded as a setup cost that it is worth paying in order to ease the subsequent determination of all visibility questions from point X. As the number of vertexes increases, paying the setup cost becomes increasingly attractive computationally. It is important that calculating the border of X does not require knowledge of Y. Thus, if there are 100 possibilities for both X and Y, we do not need to employ the algorithm 10,000 times, but only 200. To establish whether X can see Y, the border of either point is sufficient. To determine visibility set $S_X$, the border of X is sufficient. To determine visibility set $S_Y$, the border of Y is sufficient.

The main reason for investigating visibility is to efficiently calculate the shortest route between arbitrary points X and Y. Once the border function from either X or Y is determined, it can be easily determined whether X can see Y. If so, then the shortest route is direct. If not, then the shortest route will involve first going directly to some "transit vertex" i, a vertex that is visible from X. All of the vertexes on a chain, except for the start and end, are neither maxima nor minima, and it can be proved that only maxima and minima can be transit vertexes. This means that all "interior" vertices that neither start nor end a chain can safely be eliminated from the visibility sets. This is an important observation because the computational time required in formula (1.1) is strongly dependent on the cardinality of the sets $S_X$ and $S_Y$.

The conceptual complication in the discrete case is that cutting off the heads and tails of spiraling chains is not quite possible. Specifically, a long chain cannot always be truncated to an angular length of less than $2\pi$ because one invisible vertex will (usually) have to be included to make the angular length at least $2\pi$. It is possible that a ray from X will intersect a chain more than once. If chain c is spiraling in, it is possible that the successor of chain c will be itself. While the Cursor Algorithm can still be as in the continuous case, the details of operations such as "find the successor of c" must therefore change.

Although the complication in computing a successor is unwelcome, the discrete case has a compensating simplification when the distance L(c, ) must be evaluated. If c covers , then some segment (i,j) of c also covers , and that segment is easily found by advancing clockwise through vertexes of c until the unique covering segment (i,j) is found. L(c, ) is then the distance from X at angle to segment (i,j), which is easily found because the computation amounts to finding the distance to the point where a great circle intersects a circular segment. Given the dominant chain, the computation of B(,X) is simplified in the same manner.

Now consider the earlier referenced possibility 3 where the antipode of X is in the interior of the obstacle, a circumstance that does not have a counterpart in the plane. For example, imagine that the only obstacle is a convex polar cap surrounding the North Pole, and that X is the South Pole. The cap will spawn no chains because there are no maxima or minima—the winding angle simply decreases as one moves clockwise around the cap. Therefore, none of the cap's vertexes will be found visible in the Cursor Algorithm. In fact all of them are visible, but finding them invisible is harmless because none of them are maxima or minima, and can therefore be safely eliminated as transit vertexes. The Cursor Algorithm therefore does not need to be modified to anticipate the possibility that an obstacle might spawn no chains, even though that possibility is a real one. If there are no maxima and minima, then all vertexes on the obstacle can be eliminated as transit points, and this happens automatically when there are no chains. If chains are spawned by an obstacle that has an antipode in its interior, they are handled in the usual manner.

With reference to FIG. 4, a system for determining the shortest oceanic routes 200 is illustrated. Suitably, an ocean routing system 202 includes a computer 204 or other digital processing device, including storage and a digital processor, such as a microprocessor, microcontroller, or graphic processing unit (GPU). In other embodiments, the ocean routing system 202 is embodied by a server including a digital processor and access to digital data storage, such server being suitably accessed via the Internet or a local area network.

The system 200 also suitably includes or is operatively connected with one or more user input systems 206 such as an illustrated input device 208 for receiving user input to control the ocean routing system 202, and further includes or is operatively connected with one or more display devices such as an illustrated display 210 for displaying output generated based on the output of the ocean routing system 202. In other embodiments, the input for controlling the ocean routing system 202 is received from another program running previously to or concurrently with the ocean routing system 202 on the computer 202, or from a network connection, or so forth. Similarly, in other embodiments the output may serve as input to another program running subsequent to or concurrently with the ocean routing system 202 on the computer, or may be transmitted via a network connection. In one embodiment, the ocean routing system 202 is located in a cloud infrastructure that is accessed by one or more user input systems 206. In other embodiments, the ocean routing system 202 and one or more user input systems 206 may be located at a single location.

As used herein, "cloud" may refer to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and reside within personal computers, local or "on-premise" servers, having at least one processing device such as a microprocessor, GPU among other processing devices and associated components. In general, cloud computing may be employed to perform services in a dissociative way, i.e., the client may not know where the service is performed as long as the service is performed with the expected quality of service.

The ocean routing system 202 includes a Cursor module 212 that implements one or more aspects of the Cursor Algorithm using the same, of the present application. In certain embodiments, the Cursor module 212 receives arbitrary points (X,Y) on the ocean from a source external to the ocean routing system 202 and determines and displays the shortest route from one arbitrary point in the ocean X to another Y. In some of such embodiments, the Cursor module 212 further accepts two arbitrary points on the ocean and dynamically finds the shortest route between them that avoids a known set of obstacles and displays the shortest route. In other of such embodiments, the Cursor module 212 displays the shortest route between the arbitrary points.

The ocean routing system 202 also includes an oceanic database 214 that stores the vertexes of the obstacles and their corresponding longitudes and latitudes. The oceanic database 214 also stores a digital map of longitude data and latitude data that is referenced by the ocean routing system 202 in determining the shortest oceanic route. The database can be updated dynamically based on the addition and/or removal of vertexes or obstacles. The oceanic database 214 is accessed by the Cursor module 212 when determining the shortest route between arbitrary wet points X and Y that avoids a known set of obstacles.

Specifically, the Cursor module 212 determines visibility to all other points, including vertexes, from an arbitrary point X, that may or may not be a vertex. It should be appreciated that the point X can be input automatically by a routing system or manually utilizing the input device 208. This visibility determination is accomplished by the previously described Cursor Algorithm, using the obstacle descriptions found in the oceanic database 214. After the visibility is determined, the Cursor module 212 determines which visible route has the shortest distance and displays it on the display 210.

In some embodiments, the Cursor module 212 is embodied by a storage medium storing instructions executable, for example, by a digital processor. The storage medium may include, for example: a magnetic disk or other magnetic storage medium; an optical disk or other optical storage medium; a random access memory, read-only memory, or other electronic memory device or chip or set of operatively interconnected chips; an Internet server from which the stored instructions may be retrieved via the Internet or a local area network; or so forth.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A computer system for determining a shortest route from an initial location point X on a sphere to a destination location point Y on the sphere comprising:
   a first memory storing an oceanic database, where the oceanic database comprises a plurality of vertex points on the sphere, where each vertex point in the plurality of vertex points defines a point on a border of a single spherical polygon in a plurality of spherical polygons, where each border of the single spherical polygon in the plurality of spherical polygons surrounds an interior region associated with one obstacle in a plurality of obstacles on the sphere, where the interior region is an area of the sphere, such that a plurality of interior regions are present where each interior region in the plurality is associated with a single obstacle;
   a second memory storing a database of predetermined data, where the predetermined data comprises a matrix of inter-vertex distances, where the matrix of inter-vertex distances comprises a shortest route $D(i,j)$ on the sphere from a given vertex i to a given vertex j and a sequence of vertexes associated with the shortest route $D(i,j)$, where the given vertex i and the given vertex j are vertex points in the plurality of vertex points, and where the sequence of vertexes comprises one or more vertexes in the plurality of vertexes;
   a display device;
   an input device; and
   a processor in data communication with the first memory, the second memory, the display device, and the input device, and the processor configured to perform steps comprising:
   receiving the initial location point X and the destination location point Y from the input device, where the initial location X and the destination location Y are locations on the sphere;
   accessing the first memory and the oceanic database stored in the first memory and retrieve the plurality of vertex points and the plurality of interior regions;
   determining a set of one or more vertexes i visible from the initial location point X, where for each vertex point i in the set of one or more vertexes i, an arc segment Xi on the sphere connects the initial location X and the each vertex point i, where the arc segment Xi does not intersect one or more interior regions in the plurality of interior regions, and where all vertex points in the plurality of vertex points having the arc segment Xi are included in the set of one or more vertexes i;
   determining a plurality of chains, where each chain in the plurality of chains comprises a group of vertexes, where the group of vertexes comprises the border of one spherical polygon in the plurality of spherical polygons, and where every vertex comprising the group of vertexes is one of the one or more vertexes i visible from the initial location point X;
   determining if the destination location point Y is visible from the initial location point X by defining an arc segment XY on the sphere, where the arc segment XY is the shortest path on the sphere from the initial location point X to the destination location point Y, and determining if the arc segment XY intersects one or more chains in the plurality of chains, and if the arc segment XY does not intersect one or more chains in the plurality of chains, determining that the destination location point Y is visible from the initial location point X, and if the arc segment XY does intersect one or more chains in the plurality of chains, determining that the destination location point Y is not visible from the initial location point X;
   defining, if the destination location point Y is visible from the initial location point X, the arc segment XY as the shortest route from the initial location point X to the destination location point Y;
   calculating, if the destination point Y is not visible from the initial location point X, the shortest route by:
   determining a set of one or more vertexes j visible from the destination location point Y, where for each vertex point j in the set of one or more vertexes j, an arc segment Yj on the sphere connects the initial location Y and the each vertex point j, where the arc segment Yj does not intersect one or more interior regions in the plurality of interior regions, and where all vertex points in the plurality of vertex points having the arc segment Yj are included in the set of one or more vertexes j;
      determining the shortest route associated with the minimal distance from the initial location point X to the final location point Y by calculating distances from the initial location point X to every vertex point i in the set of one or more vertexes i, calculating distances from every vertex point j in the set of one or more vertexes j to the destination location point Y, and accessing the second memory and the database of predetermined data stored in the second memory to determine the shortest route $D(i,j)$ from the every vertex point i in set of one or more vertexes i to the every vertex point j in set of one or more vertexes j and to determine the associated sequence of vertexes associated with the shortest route $D(i,j)$; and
   communicating with the display device to display the shortest route on the display device.

2. The computer system of claim 1 where the each border of the each single spherical polygon comprises a segment of a great circle, where the segment of the great circle is the shortest distance on the sphere between a first vertex defining a point on the each border and a second vertex defining a point on the each border.

3. The method according to claim 1, wherein determining if the destination location point Y is visible from the initial location point X comprises:
   calculating a border function B(θ, X), where the border function B(θ, X) defines a course θ and a distance L, where the course θ is a course from the initial location point X and where 0≤θ≤2π radians about the initial location point X, and where the distance L is a length of a path on the sphere from the initial location point X to a first obstacle encountered when the path has a direction corresponding to the course θ;
   calculating a distance R and calculating a specific bearing, where the distance R is a length of the arc segment XY and the specific bearing is a bearing from the initial location point X to the to the final location point Y; and
   evaluating the distance R and the distance L when the course θ is equal to the specific bearing, and if the distance R is less than or equal to the distance L, determining that the arc segment XY does not intersect one or more chains in the plurality of chains, and determining that the destination location point Y is visible from the initial location point X.

4. The computer system of claim 1 where determining the shortest route associated with the minimal distance from the initial location point X to the final location point Y when the destination point Y is not visible from the initial location point X comprises:
   selecting an initial vertex point in the set of one or more vertexes i;
   choosing an initial vertex point in the set of one or more vertexes j;
   establishing a distance d(X,i) from the initial location point X to the initial vertex point in the first set of one or more vertexes i, where the distance d(X,i) is a length of the arc segment Xi from the initial location point X to the initial vertex point in the set of one or more vertexes i;
   designating a distance d(j,Y) from the destination location point Y to the initial vertex point in the second set of one or more vertexes j, where the distance d(j,Y) is a length of the arc segment Yj from the destination location point Y to the initial vertex point in the set of one or more vertexes j;
   accessing the second memory and the database of predetermined data stored in the second memory, and retrieving the shortest route D(i,j) from the initial vertex point in the set of one or more vertexes i to the initial vertex point in the set of one or more vertexes j and retrieving the sequence of vertexes associated with the shortest route D(i,j);
   quantifying a D(X,Y) where the D(X,Y) is equal to the distance d(X,i) added to the shortest route D(i,j) added to the distance d(j,Y), and associating the D(X,Y) with the initial vertex point in the set of one or more vertexes i and the initial vertex point in the set of one or more vertexes j;
   picking a subsequent vertex point in the set of one or more vertexes i and a subsequent vertex point the set of one or more vertexes j and repeating the selecting, the choosing, the establishing, the designating, the accessing, and the quantifying steps using the subsequent vertex point in the set of one or more vertexes i as the initial vertex point in set of one or more vertexes i and using the subsequent vertex point in the set of one or more vertexes j as the initial vertex point in the set of one or more vertexes j until every vertex point in the set of one or more vertexes i has been utilized as the initial vertex point in the set of one or more vertexes i and every vertex point in the set of one or more vertexes j has been utilized as the initial vertex point in the set of one or more vertexes j, thereby generating one or more D(X,Y); and
   determining a minimum D(X,Y) from the one or more D(X,Y) and designating the initial location X, the sequence of vertexes associated with the shortest distance D(i,j) comprising the minimum D(X,Y), and the destination location point Y as the shortest route from the initial location point X to the destination location point Y.

5. The computer system of claim 1 where the arc segment Xi is a segment of a first great circle of the sphere, the arc segment XY is a segment of a second great circle of the sphere, and the arc segment Yj is a segment of a third great circle of the sphere, where the second great circle may be a great circle identical to the first great circle, and where the third great circle may be a great circle identical to the second great circle or the first great circle.

6. The computer system of claim 1 where the sphere describes the earth and where the plurality of obstacles on the sphere describes a plurality of obstacles on the earth.

7. A computer system for providing a shortest route from an initial location point X on a sphere to a destination location point Y on the sphere comprising:
   a first memory storing an oceanic database, where the oceanic database comprises a plurality of vertex points on the sphere, where each vertex point in the plurality of vertex points defines a point on a border of a single spherical polygon in a plurality of spherical polygons, where each border of the single spherical polygon in the plurality of spherical polygons surrounds an interior region associated with one obstacle in a plurality of obstacles on the sphere, where the interior region is an area of the sphere, such that a plurality of interior regions are present where each interior region in the plurality is associated with a single obstacle;
   a second memory storing a database of predetermined data, where the predetermined data comprises a matrix of inter-vertex distances, where the matrix of inter-vertex distances comprises a shortest route D(i,j) on the sphere from a given vertex i to a given vertex j and a sequence of vertexes associated with the shortest route D(i,j), where the given vertex i and the given vertex j are vertex points in the plurality of vertex points, and where the sequence of vertexes comprises one or more vertexes in the plurality of vertexes;
   a display device;
   an input device; and
   a processor in data communication with the first memory, the second memory, the display device, and the input device, and the processor configured to perform steps comprising:
      receiving the initial location point X and the destination location point Y from the input device, where the initial location X and the destination location Y are locations on the sphere;
      accessing the first memory and the oceanic database stored in the first memory and retrieving the plurality of vertex points and the plurality of interior regions;
   determining a visibility set $S_x$ using the plurality of vertex points, where the visibility set $S_x$ is a first set of vertex points in the plurality of vertex points, and where for each vertex point i in the first set of vertex points, an arc segment Xi on the sphere connects the initial location X and the each vertex point i, where the arc segment Xi is a segment of a first great circle of the sphere, and where the arc segment Xi does not intersect one or more interior regions in the plurality of interior regions, and where all vertex points in the plurality of vertex points having the arc segment Xi are included in the visibility set $S_x$;

determining a plurality of chains, where each chain in the plurality of chains comprises a group of vertexes, where the group of vertexes comprises the border of one spherical polygon in the plurality of spherical polygons, and where the each vertex in the group of vertexes is one of the first set of vertex points in the visibility set $S_x$;

determining if the destination location point Y is visible from the initial location point X by defining an arc segment XY on the sphere, where the arc segment XY is the shortest path on the sphere from the initial location point X to the destination location point Y such that the arc segment XY is a segment of a second great circle of the sphere, where the second great circle may be a great circle identical to the first great circle, and determining if the arc segment XY intersects one or more chains in the plurality of chains, and if the arc segment XY does not intersect one or more chains in the plurality of chains, determining that the destination location point Y is visible from the initial location point X, and if the arc segment XY does intersect one or more chains in the plurality of chains, determining that the destination location point Y is not visible from the initial location point X;

defining, if the destination location point Y is visible from the initial location point X, the arc segment XY as the shortest route from the initial location point X to the destination location point Y, thereby determining the shortest route from the initial location point X on the sphere to the destination location point Y on the sphere; and calculating, if the destination point Y is not visible from the initial location point X, the shortest route from the initial location point X on the sphere to the destination location point Y on the sphere by performing steps comprising:

determining a visibility set $S_y$ using the plurality of vertex points, where the visibility set $S_y$ is a second set of vertex points in the plurality of vertex points, and where for each vertex point j in the second set of vertex points, an arc segment Yj on the sphere connects the initial location Y and the each vertex point j, where the arc segment Yj is a segment of a third great circle of the sphere, where the third great circle may be a great circle identical to the second great circle or the first great circle, and where the arc segment Yj does not intersect one or more interior regions in the plurality of interior regions, and where all vertex points in the plurality of vertex points having the arc segment Yj are included in the visibility set $S_y$;

selecting an initial vertex point in the visibility set $S_x$;

choosing an initial vertex point in the visibility set $S_y$;

establishing a distance d(X,i) from the initial location point X to the initial vertex point in the visibility set $S_x$, where the distance d(X,i) is a length of the arc segment Xi from the initial location point X to the initial vertex point in the visibility set $S_x$;

designating a distance d(j,Y) from the destination location point Y to the initial vertex point in the visibility set $S_y$, where the distance d(j,Y) is a length of the arc segment Xj from the initial location point Y to the initial vertex point in the visibility set $S_y$;

accessing the second memory and the database of predetermined data stored in the second memory, and retrieving the shortest distance D(i,j) from the initial vertex point in the visibility set $S_y$, to the initial vertex point in the visibility set $S_y$, and retrieving the sequence of vertexes associated with the shortest distance D(i,j) from the initial vertex point in the visibility set $S_x$ to the initial vertex point in the visibility set $S_y$;

quantifying a D(X,Y) where the D(X,Y) is equal to the distance d(X,i) added to the shortest distance D(i,j) added to the distance d(j,Y), and associating the D(X,Y) with the initial vertex point in the visibility set $S_x$ and the initial vertex point in the visibility set $S_y$;

picking a subsequent vertex point in the visibility set $S_x$ and a subsequent vertex point in the visibility set $S_y$, and repeating the selecting, the choosing, the establishing, the designating, the accessing, and the quantifying steps using the subsequent vertex point in the visibility set $S_x$ as the initial vertex point in the visibility set $S_x$ and using the subsequent vertex point in the visibility set $S_y$ as the initial vertex point in the visibility set $S_y$ until every vertex point in the visibility set $S_x$ has been utilized as the initial vertex point in the visibility set $S_x$ and every vertex point in the visibility set $S_y$ has been utilized as the initial vertex point in the visibility set $S_y$, thereby generating one or more D(X,Y); and determining a minimum D(X,Y) from the one or more D(X,Y) and designating the initial location X, the sequence of vertexes associated with the shortest distance D(i,j) comprising the minimum D(X,Y), and the destination location point Y as the shortest oceanic route from the initial location point X to the destination location point Y, thereby determining the shortest route from the initial location point X on the sphere to the destination location point Y on the sphere;

communicating with the display device to display the shortest oceanic route from the initial location point X on the sphere to the destination location point Y on the sphere, thereby providing the shortest oceanic route from the initial location point X on the sphere to the destination location point Y on the sphere.

8. The computer system of claim 7 where determining if the destination location point Y is visible from the initial location point X comprises:

calculating a border function B(θ, X), where the border function B(θ, X) defines a course θ and a distance L, where the course θ is a course from the initial location point X and where 0≤θ≤2π radians about the initial location point X, and where the distance L is a length of a path on the sphere from the initial location point X to a first obstacle encountered when the path has a direction corresponding to the course θ;

calculating a distance R and calculating a specific bearing, where the distance R is a length of the arc segment XY and the specific bearing is a bearing from the initial location point X to the to the final location point Y; and evaluating the distance R and the distance L when the course θ is equal to the specific bearing, and if the distance R is less than or equal to the distance L, determining that the arc segment XY does intersect one or more chains in the first plurality of chains, and determining that the destination location point Y is not visible from the initial location point X.

9. The computer system of claim 8 where the each border of the each single spherical polygon comprises at least one segment of a great circle, where the at least one segment of the great circle is the shortest distance on the sphere between a first vertex defining a point on the each border and a second point defining a point on the each border.

10. The computer system of claim 9 where the sphere describes the earth and where the plurality of obstacles on the sphere describes a plurality of obstacles on the earth.

11. A non-transitory computer readable medium having stored therein instructions executable by a processor to cause the processor to perform functions of:

receiving an initial location point X and a destination location point Y from an input device, where the initial location X and the destination location Y are locations on a sphere;

accessing a first memory in data communication with the processor where the first memory stores an oceanic database, where the oceanic database comprises a plurality of vertex points on the sphere, where each vertex point in the plurality of vertex points defines a point on a border of a single spherical polygon in a plurality of spherical polygons, where each border of the single spherical polygon in the plurality of spherical polygons surrounds an interior region associated with one obstacle in a plurality of obstacles on the sphere, where the interior region is an area of the sphere, such that a plurality of interior regions are present where each interior region in the plurality is associated with a single obstacle;

retrieving the plurality of vertex points and the plurality of interior regions;

determining a visibility set $S_x$ using the plurality of vertex points, where the visibility set $S_x$ is a first set of vertex points in the plurality of vertex points, and where for each vertex point i in the first set of vertex points, an arc segment Xi on the sphere connects the initial location X and the each vertex point i, and the arc segment Xi does not intersect one or more interior regions in the plurality of interior regions, and where all vertex points in the plurality of vertex points having the arc segment Xi are included in the visibility set $S_x$;

determining a plurality of chains, where each chain in the plurality of chains comprises a group of vertexes, where the group of vertexes comprises the border of one spherical polygon in the plurality of spherical polygons, and where the each vertex is one of the first set of vertex points in the visibility set $S_x$;

determining if the destination location point Y is visible from the initial location point X by defining an arc segment XY on the sphere, where the arc segment XY is the shortest path on the sphere from the initial location point X to the destination location point Y, and determining if the arc segment XY intersects one or more chains in the plurality of chains, and if the arc segment XY does not intersect one or more chains in the plurality of chains, determining that the destination location point Y is visible from the initial location point X, and if the arc segment XY does intersect one or more chains in the plurality of chains, determining that the destination location point Y is not visible from the initial location point X;

defining, if the destination location point Y is visible from the initial location point X, the arc segment XY as the shortest route from the initial location point X to the destination location point Y, thereby determining the shortest route from the initial location point X on the sphere to the destination location point Y on the sphere; and calculating, if the destination point Y is not visible from the initial location point X, the shortest route by performing steps comprising:

determining a visibility set $S_y$ using the plurality of vertex points, where the visibility set $S_y$ is a second set of vertex points in the plurality of vertex points, and where for each vertex point j in the second set of vertex points, an arc segment Yj on the sphere connects the initial location Y and the each vertex point j, and the arc segment Yj does not intersect one or more interior regions in the plurality of interior regions, and where all vertex points in the plurality of vertex points having the arc segment Yj are included in the visibility set $S_y$;

selecting an initial vertex point in the visibility set $S_x$;

choosing an initial vertex point in the visibility set $S_y$;

establishing a distance d(X,i) from the initial location point X to the initial vertex point in the visibility set $S_x$, where the distance d(X,i) is a length of the arc segment Xi from the initial location point X to the initial vertex point in the visibility set $S_x$;

designating a distance d(j,Y) from the destination location point Y to the initial vertex point in the visibility set $S_y$, where the distance d(j,Y) is a length of the arc segment Yj from the initial location point Y to the initial vertex point in the visibility set $S_y$;

accessing a second memory in data communication with the processor, where the second memory stores a database of predetermined data, where the predetermined data comprises a matrix of inter-vertex distances, where the matrix of inter-vertex distances comprises a shortest route D(i,j) on the sphere from a given vertex i to a given vertex j and a sequence of vertexes associated with the shortest route D(i,j), where the given vertex i and the given vertex j are vertex points in the plurality of vertex points, and where the sequence of vertexes comprises one or more vertexes in the plurality of vertexes, and retrieving the shortest route D(i,j) from the initial vertex point in the visibility set $S_x$ to the initial vertex point in the visibility set $S_y$ and retrieving the sequence of vertexes associated with the shortest route D(i,j) from the initial vertex point in the visibility set $S_x$ to the initial vertex point in the visibility set $S_y$;

quantifying a D(X,Y) where the D(X,Y) is equal to the distance d(X,i) added to the shortest route D(i,j) added to the distance d(j,Y), and associating the D(X,Y) with the initial vertex point in the visibility set $S_x$ and the initial vertex point in the visibility set $S_y$;

picking a subsequent vertex point in the visibility set $S_x$ and a subsequent vertex point in the visibility set $S_y$ and repeating the selecting, the choosing, the establishing, the designating, the accessing, and the quantifying steps using the subsequent vertex point in the visibility set $S_x$ as the initial vertex point in the visibility set $S_x$ and using the subsequent vertex point in the visibility set $S_y$ as the initial vertex point in the visibility set $S_y$ until every vertex point in the visibility set $S_x$ has been utilized as the initial vertex point in the visibility set $S_x$ and every vertex point in the visibility set $S_y$ has been utilized as the initial vertex point in the visibility set $S_y$, thereby generating one or more D(X,Y); and determining a minimum D(X,Y) from the one or more D(X,Y) and designating the initial location X, the sequence of vertexes associated with the shortest distance D(i,j) comprising the minimum D(X,Y), and the destination location point Y as the shortest oceanic route from the initial location point X to the destination location point Y, thereby determining the shortest route from the initial location point X on the sphere to the destination location point Y on the sphere;

communicating with a display device to display the shortest route from the initial location point X on the sphere to the destination location point Y on the sphere, thereby providing the shortest route from the initial location point X on the sphere to the destination location point Y on the sphere.

12. The non-transitory computer readable medium computer system of claim 11 where determining if the destination location point Y is visible from the initial location point X comprises:

calculating a border function B(θ, X), where the border function B(θ, X) defines a course θ and a distance L, where the course θ is a course from the initial location point X and where 0≤θ≤2π radians about the initial location point X, and where the distance L is a length of a path on the sphere from the initial location point X to a first obstacle encountered when the path has a direction corresponding to the course θ;

calculating a distance R and calculating a specific bearing, where the distance R is a length of the arc segment XY and the specific bearing is a bearing from the initial location point X to the to the final location point Y; and evaluating the distance R and the distance L when the course θ is equal to the specific bearing, and if the distance R is less than or equal to the distance L, determining that the arc segment XY does intersect one or more chains in the first plurality of chains, and determining that the destination location point Y is not visible from the initial location point X.

13. The non-transitory computer readable medium computer system of claim 12 where the arc segment Xi is the shortest route from the initial location point X to the each vertex point i, and where the arc segment Yj is the shortest route from the destination location point y to the each vertex point j such that the arc segment Xi is a segment of a first great circle of the sphere, the arc segment XY is a segment of a second great circle of the sphere, and the arc segment Yj is a segment of a third great circle of the sphere, and where the second great circle may be a great circle identical to the first great circle, and where the third great circle may be a great circle identical to the second great circle or the first great circle.

14. The non-transitory computer readable medium computer system of claim 13 where the each border of the each single spherical polygon comprises at least one segment of a great circle, where the at least one segment of the great circle is the shortest distance on the sphere between a first vertex defining a point on the each border and a second point defining a point on the each border.

15. The non-transitory computer readable medium computer system of claim 14 where the sphere describes the earth and where the plurality of obstacles on the sphere describe a plurality of obstacles on the earth.

* * * * *